United States Patent

[11] 3,615,775

[72] Inventor Frederick J. Teeter
 Pittsburgh, Pa.
[21] Appl. No. 45,221
[22] Filed June 10, 1970
[45] Patented Oct. 26, 1971
[73] Assignee Dresser Industries, Inc.
 Dallas, Tex.

[54] HIGH ALUMINA REFRACTORY COMPOSITION
 5 Claims, 3 Drawing Figs.
[52] U.S. Cl. .................................................. 106/59,
 106/62, 106/65, 106/66
[51] Int. Cl. ....................................................... C04b 35/10
[50] Field of Search ........................................... 106/62, 65,
 66, 59

[56] References Cited
UNITED STATES PATENTS
3,192,058 6/1965 Davies et al. ................. 106/66

Primary Examiner—James E. Poer
Attorneys—Robert W. Mayer, Thomas P. Hubbard, Jr., Daniel Rubin, Raymond T. Majesko, Roy L. Van Winkle, William E. Johnson, Jr. and Eddie E. Scott ABSTRACT: Ceramically bonded high alumina refractory comprising $Al_2O_3$, MgO and $Cr_2O_3$, the molar ratio of the MgO to $Cr_2O_3$ between 1:1 and 2.5:1, said refractory microscopically characterized by coarse alumina grains having $Cr_2O_3$ in solid solution, said alumina grains knitted together by a solid solution of $MgO \cdot Al_2O_3 \cdot Cr_2O_3$ spinel.

INVENTOR.
FREDERICK J. TEETER
BY
ATTORNEY

HIGH ALUMINA REFRACTORY COMPOSITION

BACKGROUND OF THE INVENTION

This is a continuation-in-part of application, Ser. No. 711,305, filed Mar. 7, 1968 now abandoned.

Refractory brick are classified as acid and basic. Acid refractories are those that tend to resist the corrosive action of acid slags but are attacked by basic slags. Acid refractories include those prepared from silica, fireclay and high alumina refractory materials. They differ in chemical analysis primarily in their alumina:silica ratio. The composition having the highest melting point in the alumina system is pure alumina. In view of this, it is indeed surprising that 99 percent $Al_2O_3$ refractory brick (the purest that are commercially produced) are not the most refractory acid brick. (Refractoriness is generally defined as the ability to resist compressive loads at elevated temperatures.) As taught in U.S. PAT. No. 3,067,050, special silica additions to high-purity alumina grain provide improved refractoriness. Also, as taught in U.S. Pat. No. 3,192,058, special chromic oxide additions to high-purity alumina brick improve refractoriness. Applicant has found yet another way to make high-purity alumina brick more refractory. Brick made according to applicant's teachings are especially useful in lining blast furnace walls in the areas of most severe wear.

Good refractoriness or ability to withstand loads at elevated temperatures is only one of several properties that refractory brick should desirably have. Slag resistance or ability to resist the erosion and corrosion of the slags contacting the brick is necessary. Also, dimensional stability is obviously essential. It is an object of this invention to provide a high-purity alumina refractory having good refractoriness, good resistance to acid slags, and a slight reheat expansion which promotes dimensional stability by counteracting load subsidence.

BRIEF DESCRIPTION OF THE INVENTION

According to this invention, a ceramically bonded refractory is provided which consists of between 80 and 95 percent $Al_2O_3$, the remainder excluding less than 1 percent incidental impurities comprising MgO and $Cr_2O_3$. The molar ratio of the MgO to $Cr_2O_3$ is between 1:1 and 2.5:1. Typically, the shapes are prepared from a batch comprising size-graded, Bayer process calcined alumina, often referred to as tabular alumina. In a typical size-grading, at least about 50 percent of the tabular is greater than 65 mesh and the remainder is smaller than 65 mesh. Optimum size gradings of refractories batches are well known in the refractories art. To this batch are added fine (minus 65 mesh) magnesia and $Cr_2O_3$ yielding materials. Preferably, the MgO yielding material is ball milled, dead burned magnesite and the $Cr_2O_3$ yielding material pigment grade chromic oxide. Such chromic oxide comprises a substantial portion less than 1 micron in size. This size-graded batch comprising tabular alumina, magnesia-yielding materials and $Cr_2O_3$ yielding materials is then mixed with a tempering agent and a binder and pressed into shapes which are thereafter dried and burned at temperatures in excess of about 2,800°F. Preferably, the brick are burned at temperatures in excess of 3,000° F. A microstructure of brick according to this invention is characterized by coarse alumina grains having $Cr_2O_3$ in solid solution, said alumina grains knitted together by a solid solution of $MgO \cdot Al_2O_3$ spinel.

DETAILED DESCRIPTION

Figure 2:
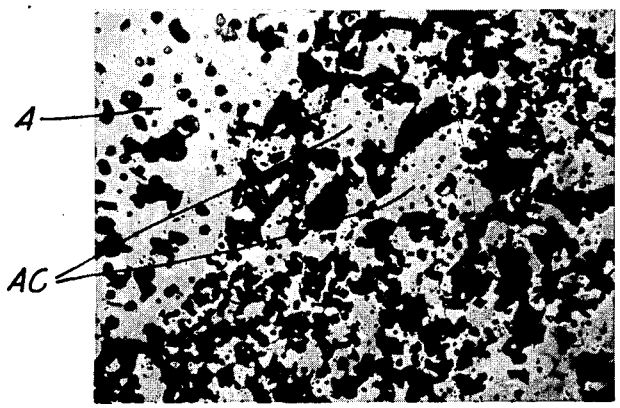
FIG. 2 is a photomicrograph of example II.

Further features and other objects and advantages of this invention will become clear to those skilled in the art by a careful study of the following detailed description.

In this specification and appended claims, all percentages and ratios and parts are by weight; chemical analyses were obtained by spectrographic analysis with control by wet chemical analysis and are reported as oxides in accordance with the present practice of the refractories industry. All sizings are measured by the Tyler screen series. Three exemplary mixes were prepared from the batches given in the following table.

TABLE I

| Example | I | II | III |
|---|---|---|---|
| Tabular Alumina | | | |
| 6/10 | 20% | 20% | 20% |
| 10/28 | 30 | 30 | 30 |
| 28/65 | 10 | 10 | 10 |
| −65 | 25 | 30 | 20 |
| Chromic Oxide | 10 | 10 | 10 |
| Magnesium Oxide | 5 | | 10 |
| Dextrin Added | 2 | 2 | 2 |
| Water Added | 3.20 | 3.25 | 3.70 |

These batches contained a dextrin binder and sufficient water to bring them to a pressable consistency. Thereafter, the batches were pressed into brick or shapes at about 8,000 p.s.i. The shapes were dried overnight at 250° F. and thereafter burned with a maximum temperature of 3,020° F. with a 10-hour hold at the maximum temperature.

The burned brick were subjected to tests standard in the refractories industry. The results of these tests are given in table II.

TABLE II

| Example: | I | II | III |
|---|---|---|---|
| Bulk Density, pcf | 195 | 198 | 185 |
| Modulus of Rupture, p.s.i. | | | |
| At Room Temperature | 5,750 | 5,410 | 3,690 |
| Apparent Porosity | 17.9% | 18.0% | 20.8% |
| Reheat 3,300° F. | | | |
| Linear Change | +0.6 | −0.2 | +1.5 |
| Volume Change | +1.5 | −1.2 | +4.7 |
| Load Test, 25 p.s.i. (Av. 2) | | | |
| Linear Subsidence at 3,200° F. | | | |
| (90 minute hold): | 0.15% | 0.0% | 1.1% |
| Drip Slag Test, 300 grams of | | | |
| Blast Furnace Slag at 2,700° F. | | | |
| Erosion, cc. | 7 | 7 | not tested |
| Spectrochemical Analysis | | | |
| Silica ($SiO_2$) | 0.14% | 0.06% | 0.19% |
| Alumina ($Al_2O_3$) | | balance | |
| Titania ($TiO_2$) | 0.02 | 0.02 | 0.03 |
| Iron Oxide ($Fe_2O_3$) | 0.21 | 0.29 | 0.16 |
| Chromic Oxide ($Cr_2O_3$) | 10.7 | 10.4 | 10.5 |
| Lime (CaO) | 0.17 | 0.08 | 0.30 |
| Magnesia (MgO) | 4.8 | 0.04 | 9.3 |

Example I is the best mode now known for the practice of this invention. For comparison, example II is made according to the teachings of U.S. Pat. No. 3,192,058 and example III is made with an excess of magnesia.

Example I demonstrates that brick made according to this invention have superior strength. This is attributed to their excellent density and well-knit microstructure. Brick, according to this invention, also have excellent refractoriness. By way of comparison, a 99 percent $Al_2O_3$ brick without special additions would have a subsidence between 4 and 6 percent in the 3,200° F. load test. In addition to strength at room temperature, the feature of brick according to this invention (example I), which distinguishes this from brick of example II, is the controlled slight reheat expansion. Brick linings must remain in compression to avoid separation at joints. Hence, a controlled reheat (permanent) expansion is very necessary.

The ratio of MgO to $Cr_2O_3$ in the fine fraction of brick batches according to this invention is considered critical. If the ratio of MgO to $Cr_2O_3$ is excessive, the brick will have a large burning and reheat growth which cannot be controlled. This growth is believed the result of an expansive reaction between MgO and $Al_2O_3$.

Figure 1:
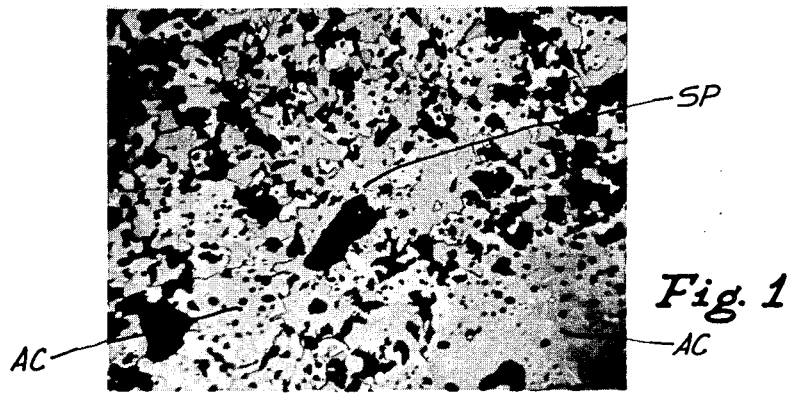
FIG. 1 is a photomicrograph of example I, which is the best mode known for the practice of this invention.

Referring now to the figures, it is apparent from FIG. 1, which is a photomicrograph of a polished section of example I, according to this invention (original magnification 225X) that a proper magnesia and chrome addition provide a high alumina refractory with a microstructure characterized by large alumina refractory with a microstructure characterized by large alumina grains containing substantial amounts of chromic oxide in solid solution AC (light grey areas) knitted together by an $MgO \cdot Al_2O_3 \cdot Cr_2O_3$ spinel SP (dark grey areas).

Figure 3:
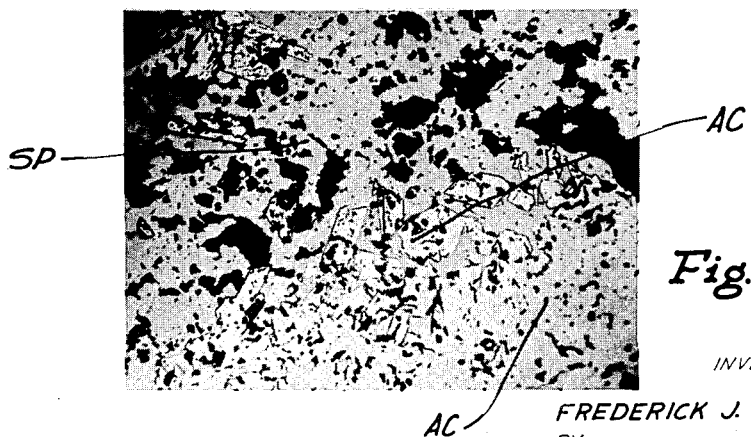
FIG. 3 is a photomicrograph of example III.

Compare FIG. 1 with FIG. 2 which is a photomicrograph of example II. This example, of course, does not have a spinel matrix. (Black areas are voids.) FIG. 3 is a photomicrograph of example III and shows an even more extensive spinel matrix. However, there are far too many large voids (black areas). These voids result from the extreme expansive reaction between magnesia and alumina when the ratio of the magnesia to chrome ore is excessive. For example, high-alumina brick made from a batch comprising tabular alumina and 5 percent dead burned magnesite ball mill fines was found to have a density of only 166 p.c.f.

Examples I and II were tested for resistance to blast furnace slag which is an acid slag. Exemplary compositions were tested in a dynamic slag test in which 1,000 grams of molten slag of the composition given in table III was dripped across samples inclined at 30° to the horizontal at 2,900° F. The samples were thereafter evaluated for erosion and penetration.

TABLE III

| | |
|---|---|
| Silica ($SiO_2$) | 37% |
| Lime (CaO) | 40% |
| Magnesia (MgO) | 9% |
| Others (by difference) | |

Examples I and II were resistant to the slag. Only 7 ccs. of refractory were washed from either sample. By way of comparison, most high-alumina refractories lose from 30 to 50 ccs. in the test. It is surprising that the magnesia addition (magnesia is considered basic) does not reduce the resistance to acid slag.

It is preferred, according to this invention, that the magnesia-yielding materials be dead burned magnesite which are ball milled so that at least 50 percent passes 65 mesh. The magnesia should typically analyze in excess of 90 percent MgO. Small amounts of hydrated magnesia are, of course, suitable. Preferably, according to this invention, the $Cr_2O_3$ used is that which is known as pigment grade and is primarily used as a pigment, and to some extent as a metallurgical source of chromium metal. Such $Cr_2O_3$ used according to the concepts of this invention is a very finely divided powder. The separate and discrete particles of the material average between about 1 and 5 microns in diameter and are remarkably uniform in this range. Such $Cr_2O_3$ materials are insoluble. Widely accepted specifications for such $Cr_2O_3$ are: purity minimums—97 percent, water insoluble impurities maximum—0.5 percent, volatile impurities maximum—0.5 percent, volatile impurities—0.5 percent. The specific gravity is about 5.1 to 5.2. The alumina used for the practice of this invention is referred to as tabular alumina. Tabular alumina is aluminum oxide converted to the corundum form by heating to temperatures slightly below the fusion point of aluminum oxide (3,700° F.). The name "tabular" is applied because of the flat tabletlike crystal facets visible in rough, broken particles. Tabular alumina is characterized by high-chemical purity, that is, in excess of 99 percent $Al_2O_3$, high density that is approximately 4 grams/cc., and a high melting point approaching 3,700° F. Small amounts of hydrated alumina or lightly calcined aluminas may be included in batches according to teachings of this invention.

In this specification, bulk density was measured by ASTM C134-14. Apparent porosity was measured by ASTM test C20-46. Modulus of rupture at room temperature was measured by ASTM Test C133-55. Load test or refractories under load at high temperature was measured by ASTM Test C16-62. Finally, the reheat change was tested according to ASTM Test C113-61.

Having thus described the invention in detail, and with sufficient particularity as to enable those skilled in the art to practice it, what is desired to have protected by Letters Patent is set forth in the following claims:

I claim:
1. Ceramically bonded refractory consisting of between 80 and 95 percent $Al_2O_3$, the remainder excluding less than 1 percent incidental impurities, comprising MgO and $Cr_2O_3$, the molar ratio of MgO to $Cr_2O_3$ being between 1:1 and 2.5:1, said brick microscopically characterized by coarse alumina grains having $Cr_2O_3$ in solid solution, said alumina grains knitted together by a solid solution of $MgO \cdot Al_2O_3 \cdot Cr_2O_3$ spinel.

2. A method of making ceramically bonded refractory comprising the steps of:
 1. preparing the batch comprising 80 to 90 percent size-graded alumina, the remainder on a calcined oxide basis finely divided MgO yielding materials and chromic oxide-yielding materials, the molar ratio of MgO to $Cr_2O_3$ being between 1:1 and 2.5:1,
 2. tempering the batch with a temporary binder and a tempering fluid,
 3. shaping the refractory,
 4. burning the refractory in excess of 2,800° F., whereby said refractory develops a microstructure characterized by coarse alumina grains having $Cr_2O_3$ in solid solution, said alumina grains knitted together by a solid solution of $MgO \cdot Cr_2B3 \cdot Al_2O_3$ spinel.

3. A method according to claim 2 in which the alumina is sized so that at least 50 percent rests on 65 mesh and the remainder passes 65 mesh.

4. The method according to claim 2 in which the MgO and $Cr_2O_3$ are −65 mesh.

5. The method according to claim 2 in which the refractory is burned in excess of 3,000° F.

* * * * *

FO-1050
(5/69)

UNITED STATES PATENT OFFICE
CERTIFICATE OF CORRECTION

Patent No. 3,615,775            Dated   October 26, 1971

Inventor(s) Frederick J. Teeter

It is certified that error appears in the above-identified patent and that said Letters Patent are hereby corrected as shown below:

Claim 2, line 15, change "$Cr_2B3$" to --$Cr_2O_3$--.

Signed and sealed this 2nd day of April 1974.

(SEAL)
Attest:

EDWARD M. FLETCHER, JR.          C. MARSHALL DANN
Attesting Officer                Commissioner of Patents